(12) United States Patent
Quinn et al.

(10) Patent No.: US 6,964,309 B2
(45) Date of Patent: Nov. 15, 2005

(54) VEHICLE WITH COMPLIANT DRIVE TRAIN

(75) Inventors: Roger D. Quinn, Akron, OH (US); Daniel A. Kingsley, Dublin, OH (US); John T. Offi, Rockford, IL (US); Roy E. Ritzmann, Cleveland Hts, OH (US)

(73) Assignee: BioRobots, LLC, Cleveland Heights, OH (US)

( * ) Notice: Subject to any disclaimer, the term of this patent is extended or adjusted under 35 U.S.C. 154(b) by 0 days.

(21) Appl. No.: 10/161,530

(22) Filed: Jun. 3, 2002

(65) Prior Publication Data

US 2002/0179342 A1 Dec. 5, 2002

Related U.S. Application Data

(60) Provisional application No. 60/295,778, filed on Jun. 4, 2001.

(51) Int. Cl.[7] .............................................. B62D 51/06
(52) U.S. Cl. ........................... 180/8.1; 180/8.5; 180/8.6
(58) Field of Search .............................. 464/54, 57, 69, 464/70, 77, 88, 89, 97, 160, 161, 61; 280/DIG. 10, 5.26, 5.28; 301/124.1; 152/105, 106, 107, 97; 305/1, 4, 5; 180/7.1, 8.1, 8.7, 8.2, 194, 8.5, 8.6, 383

(56) References Cited

U.S. PATENT DOCUMENTS

| | | | | |
|---|---|---|---|---|
| 177,064 | A | * 5/1876 | Fowler | 416/61 |
| 1,144,373 | A | 6/1915 | Morton | |
| 1,420,839 | A | * 6/1922 | Henrie | 152/93 |
| 1,450,671 | A | * 4/1923 | Lincoln | 152/97 |
| 1,465,261 | A | * 8/1923 | Gerstmayr | 152/97 |
| 2,187,938 | A | * 1/1940 | Eaid | 152/112 |
| 2,664,962 | A | * 1/1954 | Faszczuk | 180/195 |
| 3,226,878 | A | * 1/1966 | Glass | 446/356 |

(Continued)

OTHER PUBLICATIONS

Ritzmann, R.E., R.D. Quinn, J.T. Watson and S.N. Zill (Jan 2000) "Insect walking and biorobotics: A relationship with mutual benefits," *Bioscience*, 50(1):23–33.

(Continued)

*Primary Examiner*—Lesley D. Morris
*Assistant Examiner*—Daniel Yeagley
(74) *Attorney, Agent, or Firm*—Renner, Otto, Boisselle & Sklar, LLP

(57) ABSTRACT

A vehicle that is propelled by as few as one actuator through a compliant drive train can move quickly on relatively smooth terrain and can climb obstacles. The body of the vehicle may consist of a single segment or multiple segments connected by articulating joints. The driving appendages can take different forms including legs or specialized legs with multiple spokes attached to a rotating hub. The driving appendages can be propelled by as few as one actuator. The driving appendages are each serially connected to their actuator(s) by a compliant device. The compliant devices permit relative motion between driving appendages that share the same actuator. A springably biased compliant device maintains nominal-desired phasing among driving appendages until one of them is forcibly perturbed. The phasing of the driving appendages, or gait, adapts to the terrain. Mechanical stops limit the excursion of the compliant device such that a new desirable leg phasing is reached for climbing large obstacles. The elasticity of the compliant device restores the phasing of the driving appendages to their nominal state when the perturbation is removed. Compliance in the driving appendages and feet smooth the cyclic motion of the body. Compliant feet conform to the terrain and provide improved traction. Steering mechanisms rotate the plane of action of the driving appendages.

51 Claims, 12 Drawing Sheets

U.S. PATENT DOCUMENTS

| | | | | |
|---|---|---|---|---|
| 3,411,599 | A | * 11/1968 | Kahlmorgan | 180/8.2 |
| 3,529,479 | A | * 9/1970 | Ryan | 74/15.4 |
| 3,695,727 | A | * 10/1972 | Sesky et al. | 301/43 |
| 4,200,161 | A | 4/1980 | Penington, Jr. | 180/8 A |
| 4,406,640 | A | * 9/1983 | Franklin et al. | 464/91 |
| 4,502,556 | A | 3/1985 | Bartholet | 180/8.6 |
| 4,503,924 | A | 3/1985 | Bartholet et al. | 180/8.6 |
| 4,944,278 | A | * 7/1990 | Woodard | 123/559.1 |
| 4,960,179 | A | 10/1990 | Leach | 180/8.2 |
| 5,085,289 | A | * 2/1992 | Chance | 180/383 |
| 5,121,805 | A | 6/1992 | Collie | 180/8.1 |
| 6,296,096 | B1 | * 10/2001 | Chludek | 192/58.41 |
| 6,481,513 | B2 | 11/2002 | Buehler et al. | 180/8.6 |
| 2001/0054518 | A1 | 12/2001 | Buehler et al. | 180/8.1 |

OTHER PUBLICATIONS

Alexander, R. McN. (Apr. 1990) "Three uses for springs in legged locomotion," *International Journal of Robotics Research*, 9(2):53–61.

U. Saranli, M. Buehler and D.E. Koditschek (Apr. 2000) "Design, Modeling and Preliminary Control of a Compliant Hexapod Robot," Proceedings 2000 IEEE International Conference on Robotics and Automation (ICRA'00), San Francisco, CA.

Quinn, R.D., G.M. Nelson, R.J. Bachmann, D.A. Kingsley, J. Offi, and R.E. Ritzmann (Sept 2001) "Insect Designs for Improved Robot Mobility," Proceedings $4^{th}$ International Conference on Climbing and Walking Robots (CLAWAR 2001), K.Berns and R.Dillman (eds.), Karlsruhe, Germany, pp. 69–76.

A. Martin–Alvarez, W. de Peuter, J. Hillebrand, P. Putz, A. Matthyssen, and J. F. de Weerd (May 1996) "Walking robots for planetary exploration missions," Proceeding Second World Automation Congress (WAC'96), Montpellier, France, pp. 7–14.

Espenshied, K.S., R.D. Quinn, H.J. Chiel and R.D. Beer (1993), "Leg Coordination Mechanisms in the Stick Insect Applied to Hexapod Robot Locomotion," *Adaptive Behavior*, 1(4):455–468.

Angle, C.M., and R.A. Brooks (Jul. 1990) "Small Planetary Rovers," Proceeding 1990 IEEE International Workshop on Intelligent Robots and Systems (IROS'90), pp 383–388.

Maes, P. and R.A. Brooks (Aug. 1990) "Learning to Coordinate Behaviors," Proceedings 9th Annual National Conference on Artificial Intelligence / sponsored by American Association for Artificial Intelligence, Boston MA, pp. 796–802.

Brooks, R.A. (May 1989) "A Robot that Walks; Emergent Behavior from a Carefully Evolved Network," Proceedings 1989 IEEE International Conference on Robotics and Automation (ICRA'89), Scottsdale AZ, pp. 692–696.

H. Komsuoglu, R. Altendorfer, R. Full, U. Saranli, B. Brown, D. McMordie, E. Moore, M. Buehler, and D. Koditschek (Dec. 2000) "Evidence for Spring Loaded Inverted Pendulum Running in a Hexapod Robot," Experimental Robotics VII : Proceedings 2000 International Symposium on Experimental Robotics (ISER 2000), Honolulu, HI, pp. 291–302.

M. Buehler, U. Saranli, D. Papadopoulos and D.E. Koditschek (Aug. 2000) "Dynamic Locomotion with four and six–legged robots," Proceedings $1^{st}$ International Symposium on Adaptive Motion of Animals and Machines (AMAM 2000), Montreal, Canada.

H. Komsuoglu, D. McMordie, U. Saranli, N. Moore, M. Buehler, D.E. Koditschek (May 2001) "Proprioception Based Behavioral Advances in Hexapod Robot," Proceedings of the IEEE International Conference on Robotics and Automation (ICRA'01), Seoul, Korea, pp. 3650–3655.

U. Saranli, M. Buehler, D.E. Koditschek (Jul. 2001) "RHex: A Simple and Highly Mobile Hexapod Robot," *International Journal of Robotics Research*, 20(7):616–631.

R. Altendorfer, N. Moore, H. Komsuoglu, M. Buehler, H.B. Brown Jr., D. McMordie, U. Saranli, R.J. Full, D.E. Koditschek (Nov 2001) "RHex: A Biologically Inspired Hexapod Runner," *Autonomous Robots*, 11(3):207–213.

Espenshied, K.S., R.D. Quinn, R.D. Beer and H.J. Chiel (Jul. 1996) "Biologically based distributed control and local reflexes improve rough terrain locomotion in a hexapod robot," *Robotics and Autonomous Systems*, 18(1):59–64.

Publication date unknown, U. Saranli, D.E. Koditschek "Design and Analysis of a Flipping Controller for RHex."

Publication date unknown, U. Saranli, M.Buehler "Modeling and Analysis of a Spatial Compliant Hexapod."

* cited by examiner

FIG. I

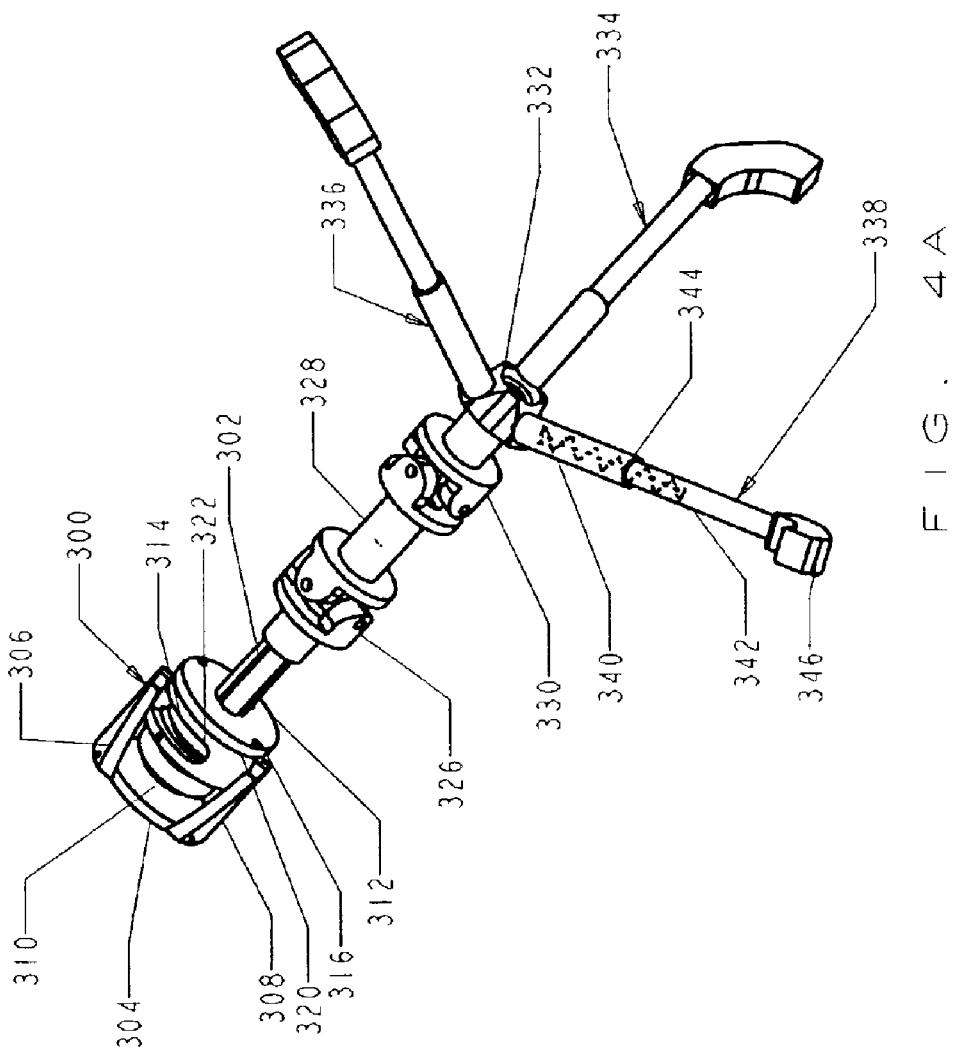

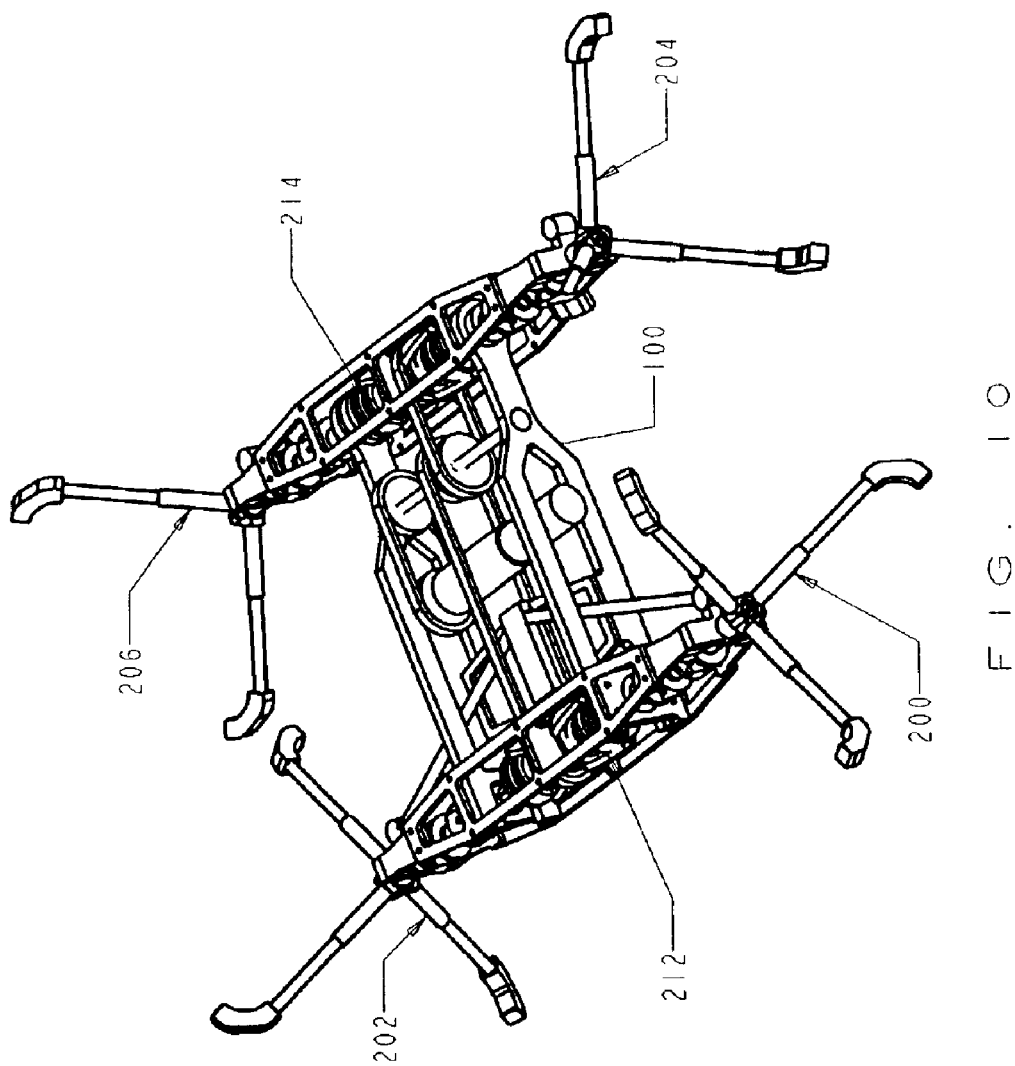

VEHICLE WITH COMPLIANT DRIVE TRAIN

CROSS-REFERENCE TO RELATED APPLICATION

This application is entitled to the benefit of Provisional Patent Application Ser. No. 60/295,778 filed Jun. 4, 2001. "An Insect-Inspired Unmanned Ground Vehicle with Improved Mobility," Roger D. Quinn et al.

STATEMENT REGARDING FEDERALLY SPONSORED RESEARCH OR DEVELOPMENT

This invention was sponsored by DARPA under contract DAAN02-98-C-4027. DARPA has released the rights to this invention to the inventors.

REFERENCE TO SEQUENCE LISTING, A TABLE, OR A COMPUTER PROGRAM LISTING COMPACT DISK APPENDIX

Not applicable

BACKGROUND OF THE INVENTION

1. Field

Generally, this invention relates to mobile vehicles and more specifically to legged vehicles. This invention also may be used to improve the mobility of vehicles that use wheels, tracks and other driving appendages.

Classifications:

180/8.1 Motor Vehicles/Stepper

180/8.6 Motor Vehicles/Stepper with Alternatively Lifted Feet or Skid

2. Prior Art

Many tasks require a vehicle or mobile robot capable of traversing a variety of terrains, including broken ground, gravel, and stairways. In many of these environments, a standard wheel is a hindrance. Early prior art in this field dealt primarily with agrarian needs, such as traction wheels for tractors, to provide greater traction than a standard wheel would allow (U.S. Pat. No. 1,144,373). In tasks such as stair climbing, a wheel's traction and surface engagement is crucial to prevent slippage. To address this issue, vehicles have been designed with variations on a standard wheel, such as one with lobed surfaces (U.S. Pat. No. 4,960,179) or one with spoke-like projections (U.S. Pat. No. 4,200,161), both allowing the vehicles to engage the surface to be climbed. A significant limitation of such designs, however, is that they are not easily adaptable for use on varying terrains, with some modification to the vehicle or its appendages typically required to even transition between climbing obstacles and moving on a level surface.

A further limitation of a standard wheel is its inability to roll over obstructions that are more than some portion of its radius. As larger and larger obstacles must be surmounted, the radius of the wheels required becomes absurd.

A patent for a toy vehicle with a non-standard wheel design (U.S. Pat. No. 3,529,479) exhibited two driving appendages consisting of a hub with spoke-like legs with an equiangular spacing. The vehicle rode on these legged-wheels and a tail-like protuberance that dragged on the ground. The vehicle was nominally able to traverse rugged surfaces. The device further contained a winch and a clutch mechanism for driving the winch, the legged-wheels, and for automatically switching between the winch and legged-wheels when a torque limit was reached. With no provision for dynamically or passively modifying the phase relationship of the legged-wheels, however, this device was not able to adjust its gait, limiting is climbing ability as well as its speed on level surfaces. Also, having only two driving appendages, its control and stability were limited. Since this device was designed for toy novelty, its climbing ability was of lesser importance.

As an alternative to wheeled vehicles, a variety of legged vehicles have been proposed (e.g., U.S. Pat. No. 5,121,805). Each leg on one of these vehicles is typically a complicated mechanism it its own right, with multiple degrees of freedom or joints. Most require several motors or other actuators to drive each leg. In place of, or in addition to, multiple actuators per leg, some designs require complicated linkages, clutches, and transmissions to drive the legs. Further, given the weight of most current designs, the motors must be outfitted with heavy gear trains in order to lift and propel the vehicle. In some cases (U.S. Pat. Nos. 4,502,556, 4,503,924), complicated mechanics are used to decouple the horizontal and vertical motion. While decoupling these motions reduces power consumption on level ground, this is only with the addition of mechanical complexity. The motors and mechanical devices found in these designs add significant weight to the vehicles, greatly limiting their speed and agility. Additionally, sophisticated computers, sensors, and control algorithms are required to make these vehicles function. These designs are thus hampered by their complexity, bulk, and weight, often resulting in unreliable, expensive, slow, and ponderous vehicles.

A recent example of prior art is US PA 2001/0054518, a 6 legged walking vehicle, using one motor per leg. The legs are actuated to produce an alternating tripod gate, wherein at least three legs are always in contact with the ground, leading to a stable pose. To produce this behavior, however, requires a sophisticated controlling computer to actuate each leg in the proper sequence, since they are not coupled mechanically. Each of these motors, then, must contain a position sensor (e.g., shaft encoder) to keep the legs in a coordinated gate. To reduce the number of actuators seen in other walking robot designs (i.e., 12–18) down to 6 also required that each motor follow a complicated trajectory, with high rotational accelerations and decelerations needed to swing each leg around to produce the tripod gate. Furthermore, while reducing the number of actuators down to 6 is a great improvement, 6 motors are still more than what is required to drive the vehicle in a tripod gate. The added weight of these motors reduces the payload of the vehicle and increases its cost.

While the prior art has advanced the field, current designs are hampered by their weight, cost, and complexity. A simple and robust design for a walking vehicle is thus needed and would further the relevant art.

BRIEF SUMMARY OF THE INVENTION

Our invention implements passive compliance in the drive train of a vehicle. It permits the relative leg phasing of a multi-legged vehicle with one propulsion motor to adapt passively to various different terrains for stable movement.

OBJECTS AND ADVANTAGES

The primary object of our invention is to enable a vehicle with few actuators to move quickly and climb obstacles. The advantages are that such a vehicle is highly mobile, has a relatively low-cost, is lightweight, and uses a simple design.

An object of our invention is to enable the primary object for a vehicle with one drive motor used for propulsion. Because gear-motors are one of the most massive components on an electrically-actuated legged vehicle, reducing their number reduces the vehicle's weight and increases its payload capacity. Furthermore, when a single leg has a solid foothold and the other legs are slipping, the single leg requires a great amount of torque to propel the vehicle. In a one drive-motor design, all of the motor's torque is available for that leg. When individual legs or joints are driven by individual motors, each motor must be powerful enough for the worst case scenario. This requirement results in many large, heavy motors. The motor for a single drive-motor vehicle design can weigh much less than the combined weight of all of the motors on a vehicle with legs or joints driven by individual motors. A one-motor design also eliminates the need for individual active control of joints, which simplifies the controller. This simplification could reduce the possible behaviors that the robot can perform, but our invention solves these potential problems.

An object of our invention is for driving appendages or legs to move the vehicle forward or backward with a nearly constant speed given constant speed of the one drive motor. The advantage is that the drive-motor does not have to accelerate and decelerate during each cycle of leg motion to move the vehicle at near constant speed. For a robot with individually actuated legs (US PA 2001/0054518) to move at a constant speed, it must swing its legs more rapidly through their return phases than their stance phases. It uses a software control system to accelerate and decelerate its legs to maintain the relative leg phasing for a desired gait. Our invention makes this unnecessary because the vehicle moves at nearly constant speed when the drive-motor turns at constant speed.

An object of our invention is for the driving appendage or leg design to be able to support the body during locomotion on various different terrains and to reach on top of obstacles. The advantage is that a vehicle with such driving appendages can be very mobile. It can both move quickly on even terrain and it can climb obstacles if it has the necessary drive-motor torque.

An object of our invention is to cause desirable driving appendage or leg phasing. The gait or relative phasing of the legs of a vehicle is important. For example, if all of the legs are in the return phase or not supporting the body, the vehicle will collapse. A device that let the legs slip relative to the drive train, but did not return them to a stable nominal gait would be ineffective. Our invention encourages the legs of a vehicle to remain in a standard gait on even terrain, but permits them to be perturbed passively from this gait for more stable locomotion on uneven terrains. After the disturbance, our invention returns the legs to the standard gait pattern. An advantage is that our invention passively encourages stable leg phasing on different terrains and permits the vehicle to climb larger obstacles. This desirable gait adaptation requires no active control system.

An object of our invention is to enable a vehicle to reach its front driving appendages onto obstacles that are taller than the length of its driving appendages. This object will enable the vehicle to climb taller obstacles if the drive motor has the necessary torque capacity.

An object of our invention is to enable a vehicle to raise its mid-body height. The advantage of this is that it permits the vehicle's ground clearance to be increased so that it can climb over taller obstacles.

Further objects and advantages of our invention will become apparent from a consideration of the drawings and ensuing description.

BRIEF DESCRIPTION OF THE SEVERAL VIEWS OF THE DRAWING

FIG. 4A shows the left, front half-axle assembly in the drive train in its normal spring-biased relative orientation.

FIG. 10 shows an alternative embodiment of the vehicle that has four "wheg" type driving appendages.

Figure 1:
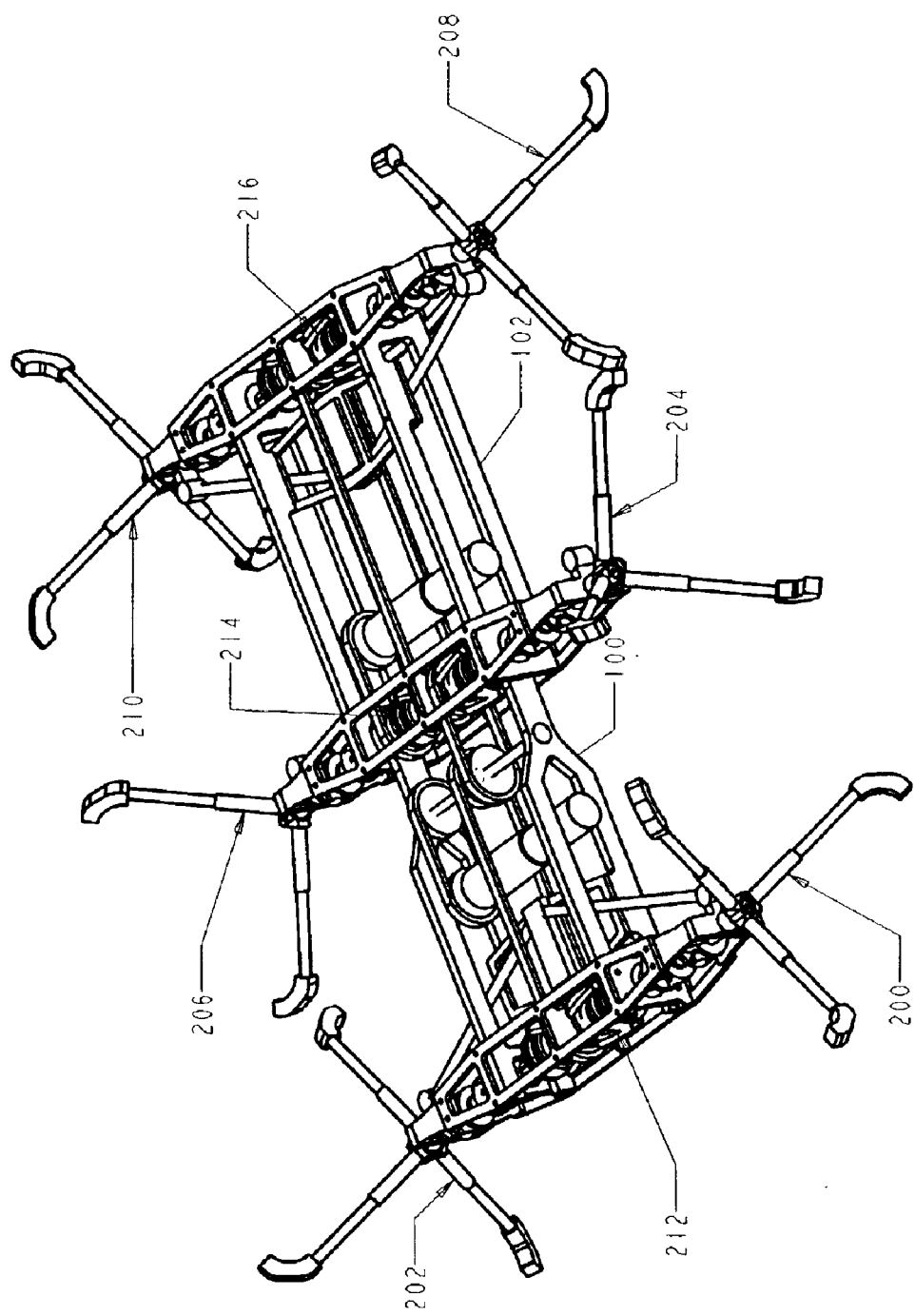
FIG. 1 shows the assembled vehicle with six wheel-leg type driving appendages (or "whegs") propelled by one drive motor.

LIST OF REFERENCE NUMERALS IN DRAWINGS 100 front body segment
102 rear body segment
104 body-joint motor-transmission
106 body-joint drive sprocket
108 body-joint chain
110 body-joint driven sprocket
112 front axle, left side ball bearing
114 front axle, center ball bearing
116 front axle, right side ball bearing
118 middle axle, left side ball bearing
120 middle axle, center ball bearing
122 middle axle, right side ball bearing
124 rear axle, left side ball bearing
126 rear axle, center ball bearing
128 rear axle, right side ball bearing
130 left, front, upper steering pin
132 left, front, lower steering pin
134 right, front, upper steering pin
136 right, front, lower steering pin
138 left, middle, upper axle bracket attachment
140 left, middle, lower axle bracket attachment
142 right, middle, upper axle bracket attachment
144 right, middle, lower axle bracket attachment
146 left, rear, upper steering pin
148 left, rear, lower steering pin
150 right, rear, upper steering pin
152 right, rear, lower steering pin
200 left, front wheg
202 right, front wheg
204 left, middle wheg
206 right, middle wheg
208 left, rear wheg
210 right, rear wheg
212 front axle assembly
214 middle axle assembly
216 rear axle assembly 218 drive motor with integral transmission
220 drive sprocket
222 drive chain
224 primary driven sprocket
226 primary drive shaft
228 front drive sprocket
230 middle drive sprocket
232 front drive chain
234 front driven sprocket
236 front inboard axle
238 middle-drive chain
240 middle-driven sprocket
242 middle-inboard axle
244 rear-drive sprocket
246 rear-drive chain
248 rear-driven sprocket
250 rear-inboard axle
252 front, left half-axle assembly
254 front, right half-axle assembly
256 middle, left half-axle assembly
258 middle, right half-axle assembly
260 rear, left half-axle assembly
262 rear, right half-axle assembly
300 front, left compliant device assembly
302 front, left outboard axle
304 inboard disk
306 finger A
308 finger B
310 coil torsion spring
312 outboard disk
314 slot for finger A
316 slot for finger B
318 normal stop for finger A
320 normal stop for finger B
322 excursion stop for finger A
324 excursion stop for finger B
326 inboard universal joint
328 drive shaft
330 outboard universal joint
332 left, front wheg hub
334 spoke assembly A
336 spoke assembly B
338 spoke assembly C
340 inner spoke member
342 outer spoke member
344 internal compression spring
346 foot
348 right, front wheg hub
350 left, middle wheg hub
352 right, middle wheg hub
354 left, rear wheg hub
356 right, rear wheg hub
358 left, front steering bracket
360 right, front steering bracket
362 left, middle axle bracket
364 right, middle axle bracket
366 left, rear steering bracket
368 right, rear steering bracket
370 left, front steering link
372 right, front steering link
374 left, rear steering link
376 right, rear steering link
378 left, front steering link pin joint
380 right, front steering link pin joint
382 left, rear steering link pin joint
384 right, rear steering link pin joint
386 front steering motor
388 rear steering motor
390 Body-joint torsion spring
400 frame
402 crank
404 rocker
406 coupler
408 foot
410 crank hub
412 rocker-frame pin joint
414 rocker-coupler pin joint
416 crank-coupler pin joint
418 wheg hub
420 spoke perpendicular to axle A
422 spoke perpendicular to axle B
424 spoke perpendicular to axle C
426 foot A
428 foot B
430 foot C

DETAILED DESCRIPTION OF THE INVENTION: DESIGN

A vehicle that embodies the invention is shown in FIG. 1.

Figure 2:
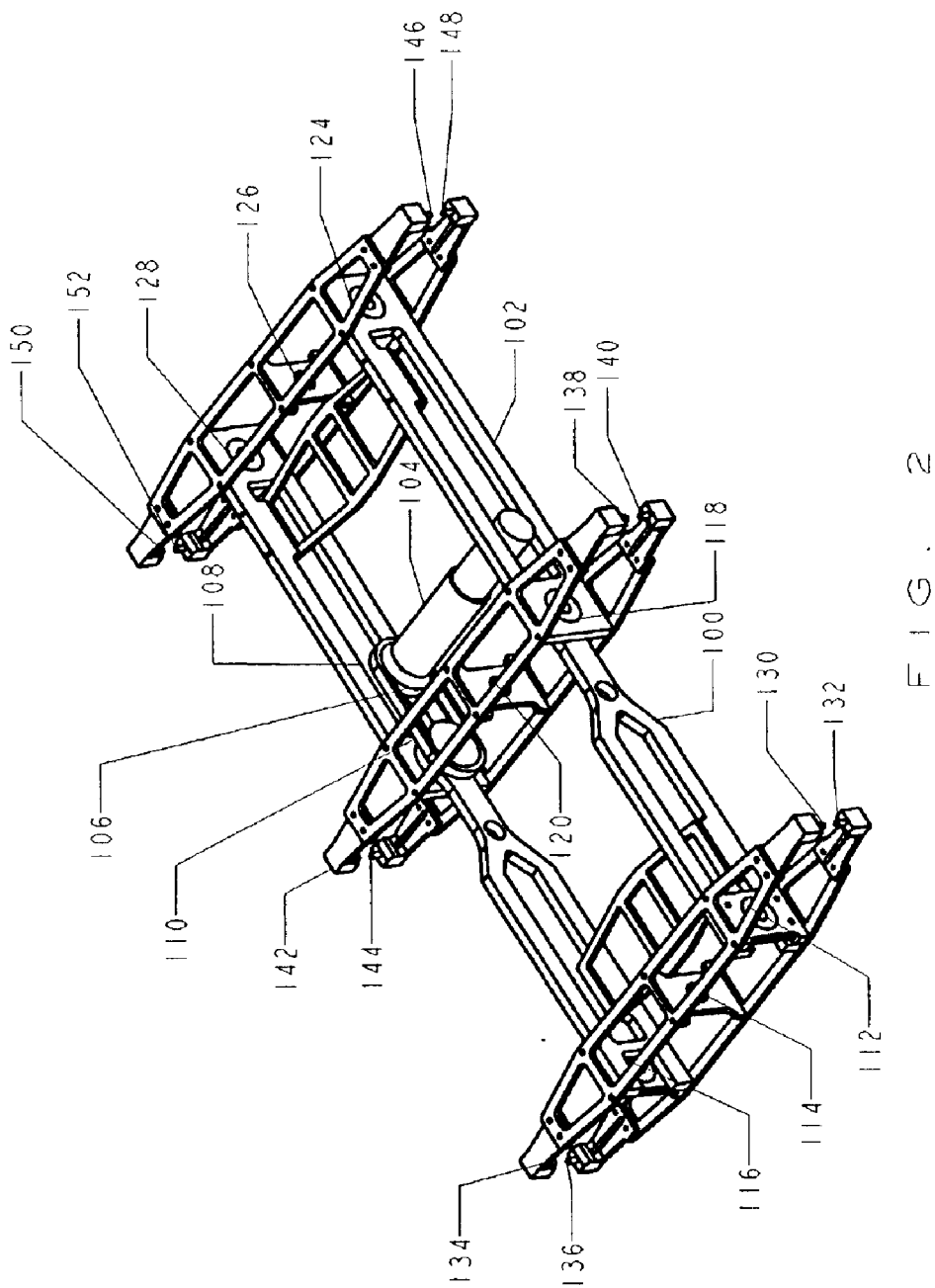
FIG. 2 shows that the body consists of two segments that are articulated about a central axis by a motor.

Body: FIG. 2

The body of the vehicle, shown in FIG. 2, consists of a rigid front segment 100 and a rigid rear segment 102 that are articulated about an axis that coincides with the centerline of the middle axle 214 of the vehicle. A body-joint motor 104 with integral transmission, mounted on the rear segment of the body, rotates the body joint. A drive sprocket 106 is mounted on the output shaft of the transmission. A chain 108 connects the drive sprocket to a driven sprocket 110, which is attached to the front segment of the body. The centerline of the driven sprocket corresponds to the centerline of the middle axle. The motor rotates the front segment up or down relative to the rear segment.

Figure 3A:
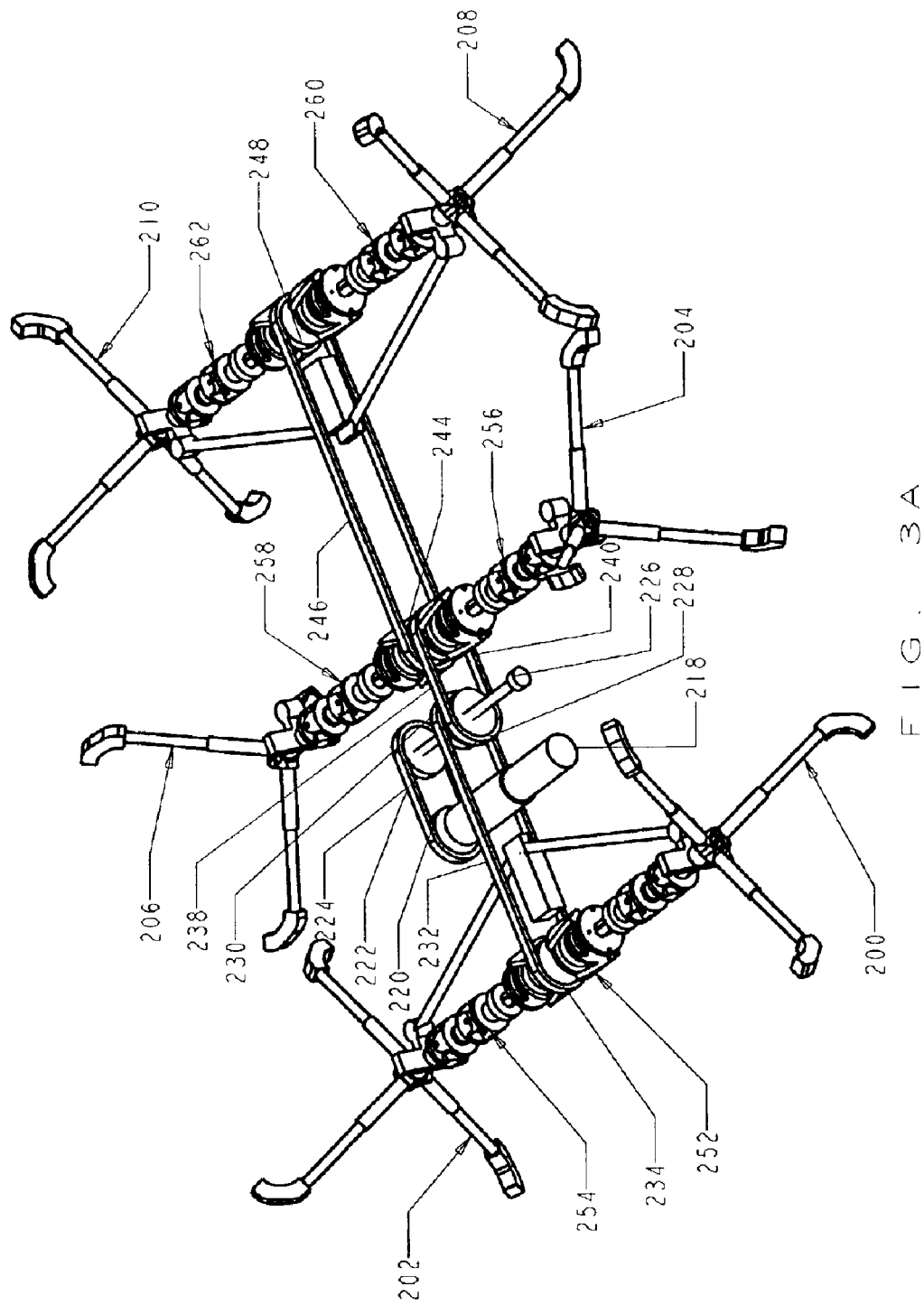
FIG. 3A shows an isometric view of the drive train and steering mechanism of the vehicle.
Figure 3B:
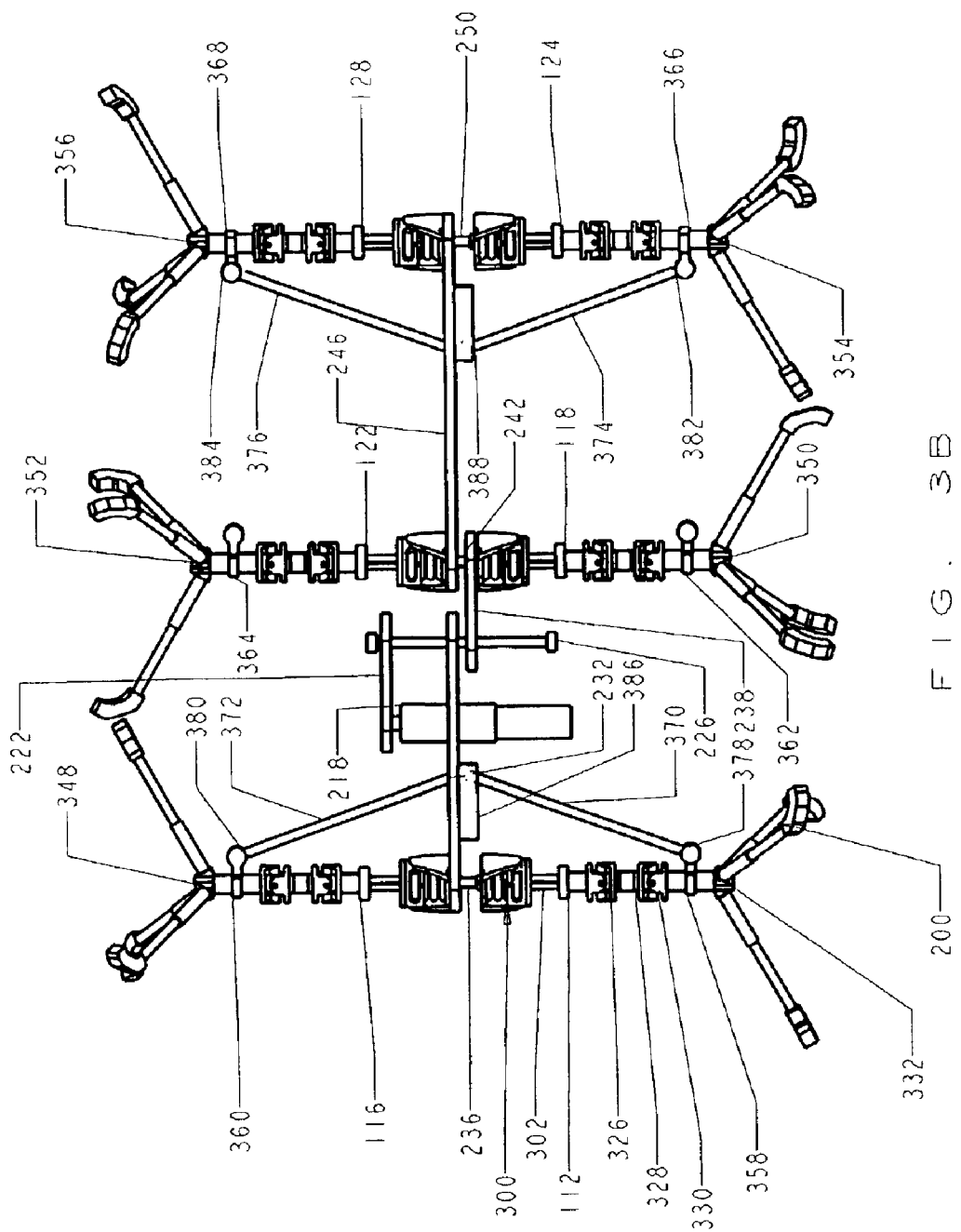
FIG. 3B shows a top view of the drive train of the vehicle.

Drive Train: FIG. 3A and 3B

A drive-motor 218 with integral transmission drives front 212, middle 214 and rear 216 axle assemblies through the drive train shown in FIGS. 3A and 3B. The front axle assembly 212 spins freely in ball bearings 112, 114, and 116. The middle axle 214 spins freely in ball bearings 118, 120, 122. The rear axle spins freely in ball bearings 124, 126, and 128.

FIG. 3A is the same as FIG. 1 except that the body has been removed to clearly show the drive train. FIG. 3B is a top view. The drive-motor is mounted on the front segment 100 of the body of the vehicle. A drive-sprocket 220 is mounted on the output shaft of the transmission. A chain 222 couples the drive-sprocket 220 and a primary driven sprocket 224 on a primary drive shaft 226. A front-drive sprocket 228 and a middle-drive sprocket 230 are mounted on the primary drive shaft 226. A chain 232 couples the front-drive sprocket 228 and front-driven sprocket 234 that is mounted on front-inboard-axle 236. A middle-drive chain 238 couples the middle-drive sprocket 230 and middle-driven sprocket 240 that is mounted on middle inboard axle 242. A rear-drive sprocket 244 mounted on the middle inboard axle 242 is the drive sprocket for the rear axle 216. A rear-drive chain 246 connects the rear-drive sprocket 244 and rear-driven sprocket 248 on rear-inboard axle 250. Each of the front, middle and rear drive and driven sprocket pairs are the same diameter.

Figure 4B:
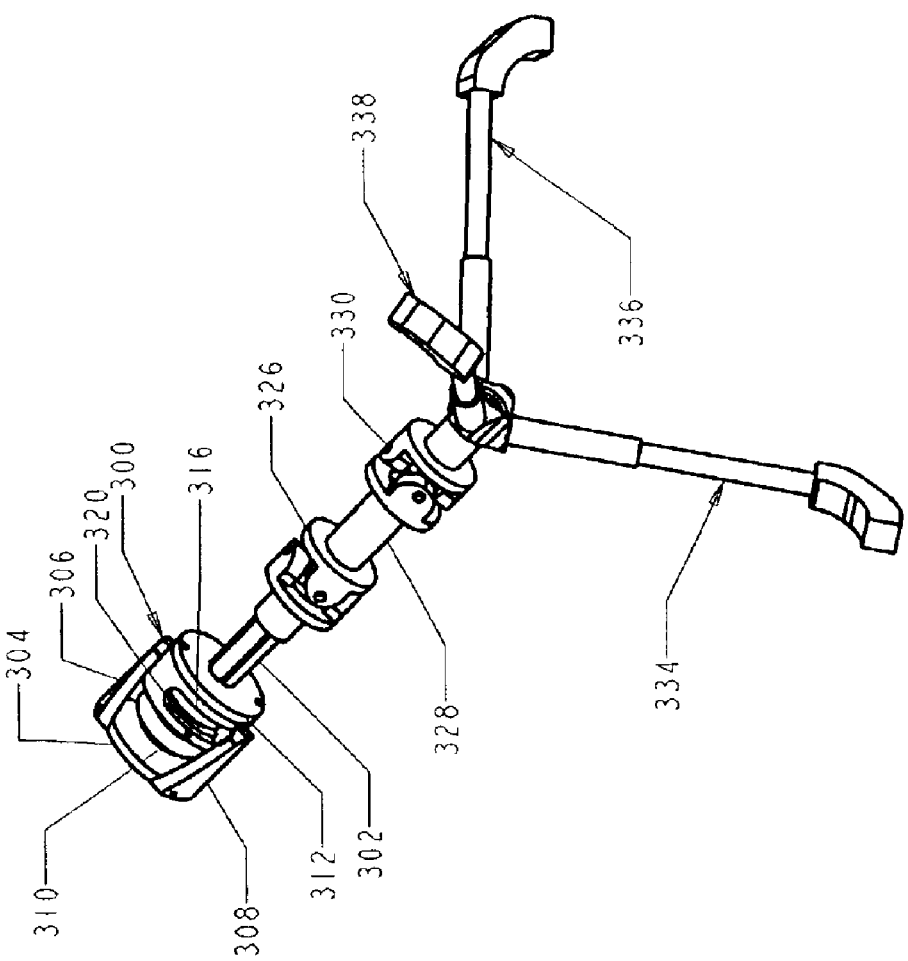
FIG. 4B shows the left, front half-axle assembly of the drive train with the compliant device rotated to its fullest excursion of 60 degrees.

Compliant Devices in the Axles: FIGS. 3B, 4A, and 4B

The front 212, middle 214 and rear 216 axle assemblies have the same design and components outboard of their respective inboard axles. Left, front half-axle assembly 252 and right, front half-axle assembly 254 are attached to the front-inboard axle 236. Left, middle half-axle assembly 256 and right, middle half-axle assembly 258 are connected to the middle-inboard axle 242. Left, rear half-axle assembly 260 and right, rear half-axle assembly 262 are connected to the rear-inboard axle 250.

The left, front half-axle assembly 252 is shown in FIG. 4A. The inboard axle 236 is connected to the drive motor 218 by means of sprockets and chains as described above. A compliant device assembly 300 connects the front-inboard axle 236 and front-left outboard axle 302. The compliant device 300 consists of three components: an inboard disk 304 with two fingers 306 and 308 attached, a coil torsion spring 310, and an outboard disk 312 with two slots 314 and 316.

The front inboard axle 236 is rigidly connected to inboard disk 304. Attached finger 306 inserts into slot 316 and finger 308 inserts into slot 314. The outboard disk 312 is rigidly connected to the outboard axle 302. A torsion spring 310 is inserted between the inboard 304 and outboard 312 disks inside the two fingers. One end of the torsion spring 310 is attached to the inboard disk 304 and the other is attached to the outboard disk 312. The spring 310 is wound in pretension during assembly such that it provides a torque that holds the finger 306 against slot end 318 and finger 308 against slot end 320 in the absence of any other torques. A torque applied to the outboard shaft can rotate the outboard axle relative to the inboard axle. The relative rotation is stopped when finger 306 contacts slot end 322 and finger 308 contacts slot end 324. The slots and fingers are dimensioned such that the outboard disk 312 can rotate 60 degrees relative to the inboard disk 304 as the fingers move from slot end to slot end. The inboard disk 304 with its two fingers 306 and 308, outboard disk 312 with two matching slots 314 and 316 and torsion spring 310 form the compliant device 300. The compliant device 300 described here is inserted into each half axle that drives each of the six driving appendages or whegs 200, 202, 204, 206, 208, and 210.

The outboard axle 302 rigidly connects the outboard disk 312 to an inboard universal joint 326. A drive shaft 328 connects the inboard universal joint 326 to an outboard universal joint 330. The outboard universal joint 330 is connected to a driving appendage's hub 332.

Driving Appendages: FIGS. 4A and 4B

The six driving appendages 200, 202, 204, 206, 208, 210 on this vehicle are specialized legs, called wheel-legs or "whegs". A front, left wheg assembly 200 has three spoke assemblies 334, 336, and 338. The spokes are mounted at equally spaced 120 degree intervals around the circumference of the hub 332. The spokes extend from the hub at an angle of 60 degrees from the axle's axis of rotation. As the axle rotates, they trace a cone with its apex at the hub. The spoke assemblies consist of four components: inner spoke 340, outer spoke 342, linear compression spring 344 and foot 346. The inner spoke 340 is attached to the hub 332 and the outer spoke 342 is attached to the foot 346. The internal, linear, compression spring 344 attaches the inner 340 and outer 342 spokes. The foot's structure is compliant so that it can bend and conform to the terrain.

Figure 5:
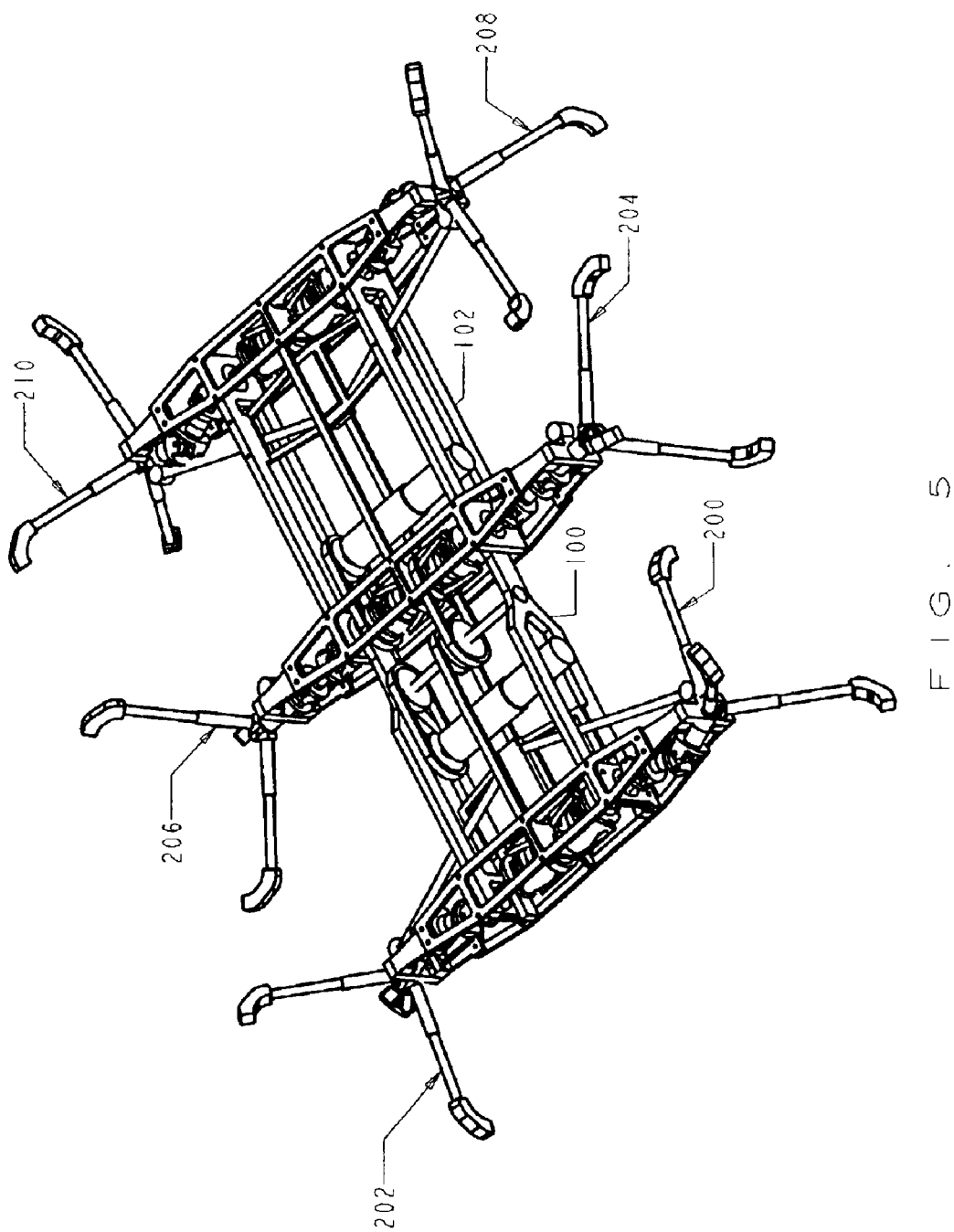
FIG. 5 shows the vehicle with its front and rear whegs rotated 30 degrees to the left and right, respectively, for a turn to the left.

Steering: FIGS. 3B and 5

The front wheg pair 200 and 202 and rear wheg pair 208 and 210 are rotated in opposite directions about the vertical axis relative to the vehicle to turn the vehicle. Front, left and right wheg hubs 332 and 348 are supported by steering brackets 358 and 360, respectively. Steering brackets 366 and 368 support rear, left and right wheg hubs 354 and 356, respectively. Each wheg hub 332, 348, 354 and 356 can spin freely in ball bearings mounted in its steering bracket. Steering bracket 358 is pin-jointed to the body by steering pins 130 and 132. Steering bracket 360 is pin-jointed to the body by steering pins 134 and 136. Steering bracket 366 is attached to the body by steering pins 146 and 148. Steering bracket 368 is attached to the body by steering pins 150 and 152. These steering pin joints permit each steering bracket and attached wheg to rotate about the vertical axis. Pin joint 378 connects steering bracket 358 to steering link 370. Pin joint 380 connects steering bracket 360 to steering link 372. Pin joint 382 connects steering bracket 366 to steering link 374. Pin joint 384 connects steering bracket 368 to steering link 376. The front steering links 370 and 372 are connected to a small front steering motor 386 mounted on the front of the chassis. The rear steering links 374 and 376 are connected to a small rear steering motor 388 mounted on the rear of the chassis.

The middle whegs 204 and 206 do not rotate or steer relative to the vehicle about the vertical axis. The middle wheg hubs 350 and 352 spin freely in ball bearings mounted in axle brackets 362 and 364, respectively. The axle bracket 362 is fixed to the chassis at pins 138 and 140. Axle bracket 364 is fixed to the chassis at pins 142 and 144.

DETAILED DESCRIPTION OF THE INVENTION: OPERATION

The vehicle is assembled such that the driving appendages or whegs are phased for a tripod gait when the compliant devices are in their normal, unperturbed states, as shown in FIG. 1. In the tripod gait the front and rear whegs on one side of the body are in phase with the middle wheg on the opposite side of the body. If there was no compliance in the drive train, the vehicle could not change its gait.

The single drive-motor 218 turns the front 236, middle 242, and rear 250 inboard axles at the same speed (FIG. 3B). The contra-lateral, or left-right, wheg pairs each share an inboard axle. Each inboard axle drives its corresponding outboard axles through the compliant devices that connect them.

Driving Appendages: FIGS. 1 and 4A

In the three-spoke wheg design used on this vehicle, the spokes are separated by 120 degrees. Because there are three spokes that each function as a leg, there are three corresponding support phases during one rotation of the wheg. Therefore, the wheg provides support for the vehicle as the wheg turns continuously at a constant speed.

The three-spoke wheg can get a foothold on an obstacle that is higher than the length of a spoke. If the motor and spoke are strong enough, then the wheg can drive the robot over such an obstacle. This design is superior to the climbing ability of a wheel if the wheel's radius is comparable to the length of one spoke.

A three-spoke design is a compromise between climbing capability and ride smoothness for our six-legged vehicle. A two-spoke wheg would have better climbing abilities, but the vertical motion of the body would be large from stride to stride. A four-spoke design would be less capable for climbing steps, but would provide a smoother ride. The ride smoothness is also acceptable as discussed below.

When our six-legged vehicle moves in a tripod gait on flat terrain, each spoke is in the support or stance phase during only 60 degrees of its rotation. During the following 60 degrees of rotation before the next spoke contacts the ground, adjacent whegs support the body. Therefore, if the spokes were rigid, the hub would translate vertically according to Change in hub height=spoke length*[1−cosine (30°)]

or about 13% of the spoke length or body height. This percentage of body height movement is similar to that of an insect during typical walking.

The compliance built into the spokes can reduce this vertical body movement further. When a spoke such as 338 supports part of the weight of the vehicle, the spoke-leg shortens. The outer spoke member 342 moves relative to inner spoke member 340, compressing the spring 344 and shortening the spoke-leg. If a spoke flexes lengthwise during the first 30 degrees of stance and extends during the second 30 degrees, the body's vertical motion is smoothed. This phase relationship also provides increased energy efficiency because energy is stored in the first half of stance and released in the second half. For a given spring stiffness in the spoke, this energy-efficient phase relationship will be attained at a particular speed of the vehicle.

Compliance in the structure of a foot 346 permits it to conform to the terrain. This provides the foot with improved traction over a rigid foot so that it can better propel the body. The foot can be fabricated from a relatively thin elastic metal or a thicker polymer. The metal foot is coated with a polymer so that it has traction similar to the one made of solid polymer.

The front axle assembly 212 is located far forward on the body, so that the spokes on the front whegs 200 and 202 can reach forward on top of upcoming obstacles (FIG. 1). This enables the vehicle to run over smaller obstacles without changing its tripod gait.

Compliant Devices: FIGS. 4A and 4B

Torsion spring 310 in compliant device assembly 300 is wound in pretension such that the fingers 306 and 308 press against the mechanical stops created by slot ends 318 and 320. The compliant device and axle assembly for a left wheg is shown in FIG. 4A in its normal, unperturbed state. These mechanical stops prevent the wheg from turning relative to its inboard axle 236 in the counter clockwise direction, as viewed from the left side of the vehicle. A clockwise disturbance torque, caused by an obstacle for example, can rotate this wheg in the clockwise direction relative to its inner axle. After it rotates 60 degrees, the fingers in the compliant device 300 contact the mechanical stops 322 and 324 formed by the other ends of the slots 314 and 316. This configuration is illustrated in FIG. 4B. These stops prevent any further relative rotation in the clockwise direction.

The compliant devices for the whegs on the right side of the vehicle operate in the same manner. They also can be rotated against the spring torque in their compliant devices in the clockwise direction relative to their inner axles, as viewed from the left side of the vehicle.

The pretension torque in the compliant devices is chosen based upon the weight of the vehicle and the length of its spokes. It is approximately equal to the spoke length times a force equal to about one-fourth the weight of the vehicle. The rate of the spring in the compliant device is low such that there is little change in torque needed to rotate the device from stop to stop, after the pretension torque is overcome.

The vehicle normally walks in a tripod gait on even terrain. The compliant devices in each of the axles permit the vehicle's wheg phasing or gait to change passively in response to the terrain. The pretension in the compliant mechanisms in each of the axles provides a passive torque that maintains the tripod gait unless a disturbance torque exceeds it. Such a disturbance torque occurs when a foot contacts an obstacle, which is about as high or higher than the length of a spoke. This causes relative motion in that wheg's compliant device. The wheg remains in that orientation until the compliant device undergoes 60 degrees of relative rotation and its fingers contact their mechanical stops. Simultaneously, the wheg on the opposite side of the body rotates and contacts the obstacle. In this configuration, these contra-lateral whegs are in phase and work together to support and lift the vehicle up and over the obstacle. When the first wheg loses contact with the obstacle, the spring in the compliant device causes it to return to its normal phasing orientation. The vehicle then continues with this contra-lateral wheg pair in its normal out-of-phase configuration.

Figure 6:
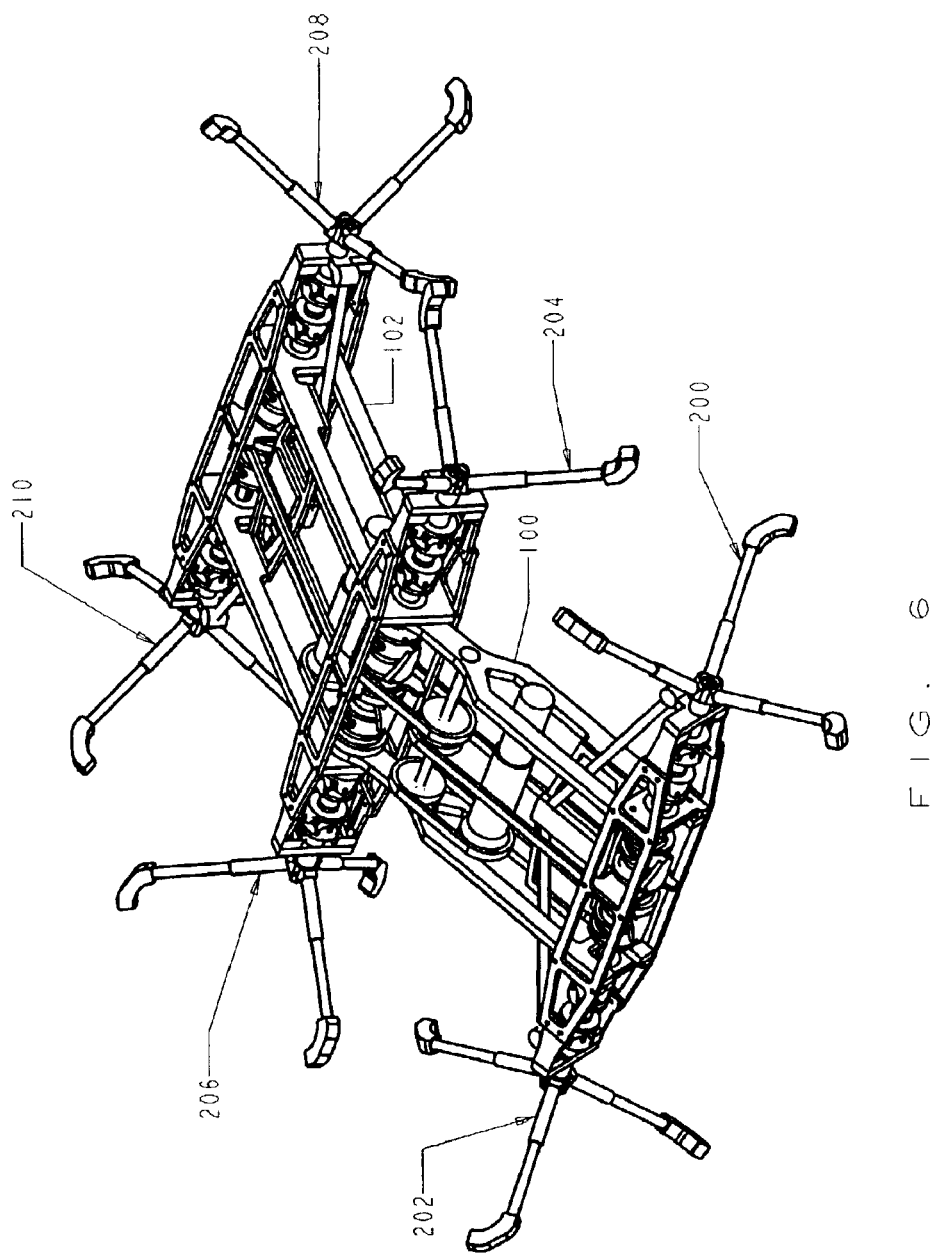
FIG. 6 shows the front segment of the vehicle rotated down relative to the rear segment.

Body Flexion Joint: FIGS. 2 and 6

The vehicle's body consists of two segments 100 and 102 that are articulated about an axis, or body flexion joint, which coincides with the centerline of the middle whegs' axle. The body flexion joint is operated using a separate body-joint motor 104. When the motor rotates clockwise as viewed from the left side of the vehicle, the front body segment 100 is rotated up relative to the rear body segment 102. In this configuration, the front whegs can reach higher for climbing taller obstacles. By rotating the motor counter clockwise, the front body segment is rotated down relative to the rear body segment as shown in FIG. 6. In this case, the mid-body ground clearance is increased and the front whegs can reach further downward.

Steering: FIGS. 3B and 5

The vehicle is steered using the two relatively small steering motors. The axis of rotation of the front pair and rear pair of whegs are altered in opposite directions to turn the vehicle. The front steering motor 386 and the rear steering motor 388 are connected electrically. When the front steering motor steers the front whegs left, the rear steering motor steers the rear whegs right. To steer left, the front steering motor pulls the left front steering link 370 and pushes the right front steering link 372, which causes the front whegs to rotate left as viewed from above. Simultaneously, the rear steering motor pulls the left rear steering link 374 and pushes the right rear steering link 376, which causes the rear whegs to rotate right as viewed from above. This combination of front and rear wheg rotation is illustrated in FIG. 5 and causes the vehicle to turn left. Opposite actions by the steering motors cause it to turn right.

Performance of Vehicle

A vehicle about 50 cm long and of a design similar that shown in FIG. 1, but without a body flexion joint, was fabricated and tested [R. D. Quinn et al. (2001). Insect Designs for Improved Robot Mobility. Proc. of $4^{th}$ Int. Conf. On Climbing and Walking Robots, Professional Engineering Publishing: London, pp. 69–76]. Its spokes are about 11.5 cm long. Our vehicle was shown to run at 3 body lengths per second, which is faster than any other known legged vehicle of similar size [according to U. Saranli et al. (2001). RHex: a simple and highly mobile hexapod robot. Int. J. Robotics Research, 20(7): 616–631.]. Our vehicle was also shown to climb rectangular steps that were greater than 1.5 times the vertical-projected length of one spoke.

The vehicle has been operated using a radio control receiver and transmitter purchased from a hobby store for standard RC model cars or boats. Model car batteries were mounted on the chassis to power the vehicle. The RC receiver was installed onboard the vehicle. One channel of the transmitter was used to signal forward or reverse speed. A second channel was used to steer the vehicle left or right.

We have also constructed and tested another vehicle similar in design to that of FIG. 1 including a body-flexion joint. It is also about 50 cm long. It has been shown to climb a series of stairs while making use of the body-flexion joint.

This vehicle was also controlled using a hobby radio control system. A third channel was used to operate the body joint.

ALTERNATIVE EMBODIMENTS

Figure 8:
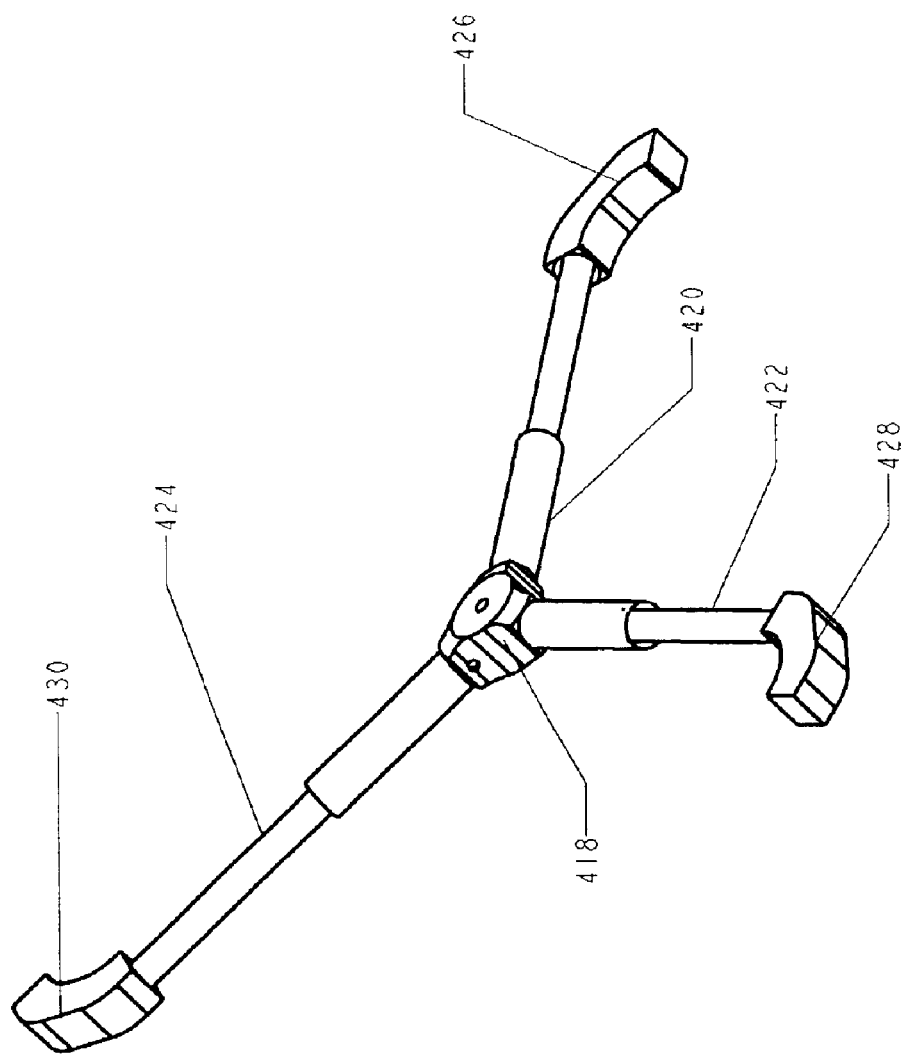
FIG. 8 shows an alternative embodiment of a "wheg" driving appendage. The spokes are perpendicular to its axis of rotation.

The driving appendages called whegs can be constructed differently than those shown in FIG. 1. For example, the spokes can extend from the hub at different angles from their hubs. FIG. 8 shows a wheg with three spokes 420, 422 and 424 extending from a hub 418. Feet 426, 428, and 430 are attached to the ends of spokes 420, 422, and 430, respectively. The long axis of each spoke extends perpendicular to the rotation axis of the wheg.

In other embodiments of whegs, the number of spokes may be greater or less than three.

Figure 7:
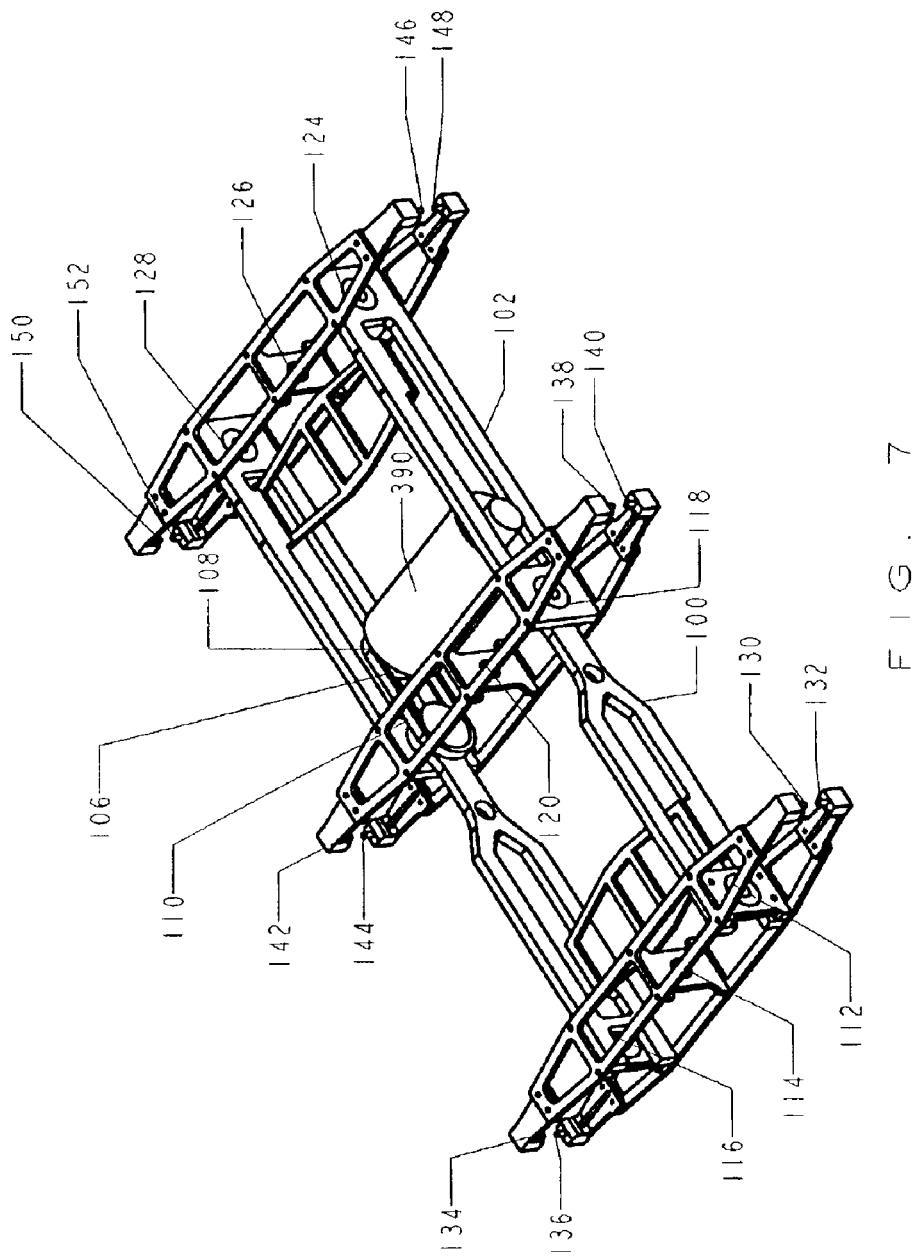
FIG. 7 shows the vehicle body with an alternative embodiment. The body-flexion joint motor has been replaced by a torsion spring.

The body-flexion joint motor 104 in FIG. 2 could be replaced with a torsion spring 390 as shown in FIG. 7. In this case the body joint flexes passively as the vehicle climbs up, over, and down obstacles. This reduces the weight of the vehicle and simplifies its control. In another design, the body-flexion motor drives the body joint through a compliant device such as the compliant device 300 used in the axles. In this case the body flexes passively, but the motor 104 can be used to actively move the joint when desired.

Figure 9:
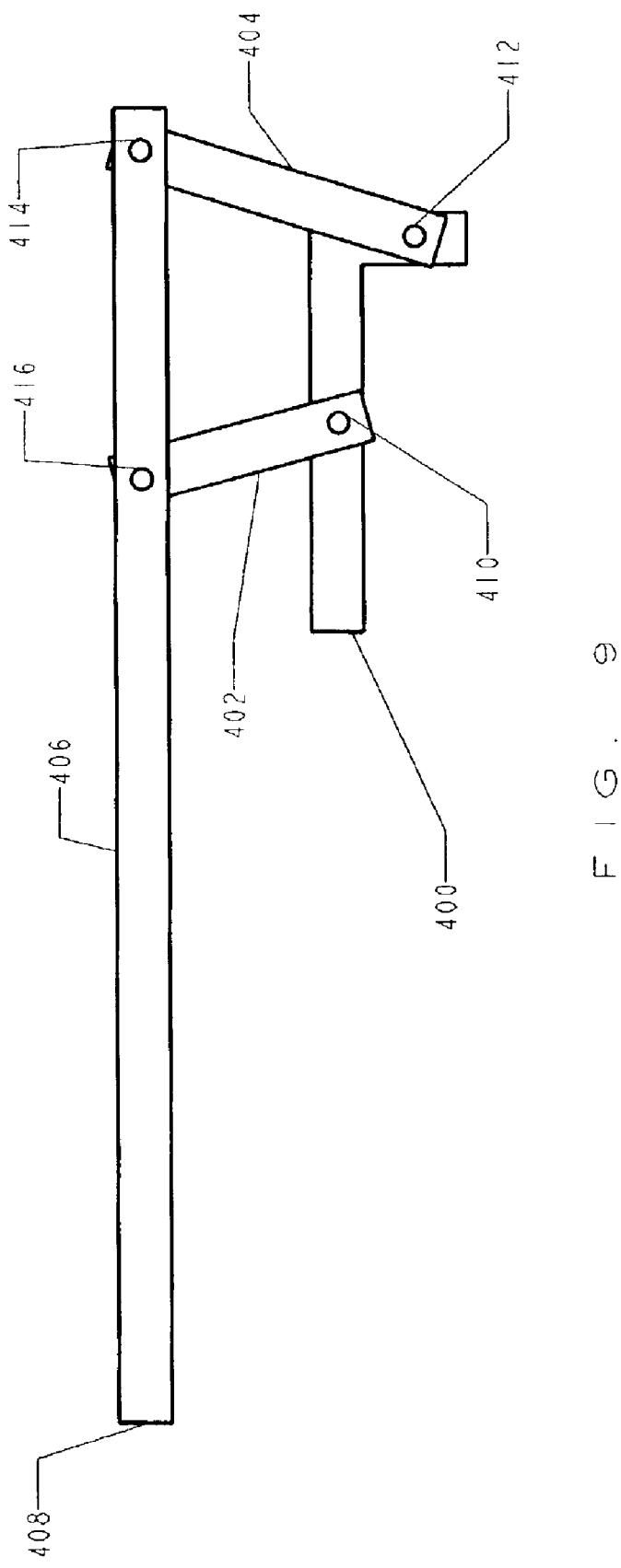
FIG. 9 shows an alternative driving-appendage. This four-bar mechanism synthesizes the motion of the front leg of a cockroach.

The compliant drive train is beneficial for vehicles with driving appendages other than the specialized legs or wheel-legs that we call "whegs". For example, an alternative front leg design is shown in FIG. 9. This four-bar mechanism synthesizes the front foot motion of a cockroach during normal walking. Two of these legs can be implemented on the vehicle of FIG. 1 to replace the front whegs 200 and 202. For example, for the left, front driving appendage, frame 400 attaches to the left, front steering bracket 358. The outer universal joint 330 attaches to crank hub 410. A crank 402 attaches to the crank hub 410. The crank 402 attaches to leg 406 by pin join 416. The leg 406 also attaches to follower 404 by pin joint 414. The follower 404 attaches to the frame 400 by pin joint 412. The drive motor 218 rotates the crank, via the drive train shown in FIG. 3B, at approximately a constant speed to cause the speed of a foot 408 to be nearly constant during the support phase. The leg 406 reaches in front of the vehicle for climbing obstacles. The right and left front legs are assembled such that they are out of phase in normal walking. The compliant device 300 in the drive axles permits the front legs to move in phase when obstacles are encountered so that larger obstacles can be climbed. The middle and rear whegs could also be replaced with legs of similar or other designs.

The coil torsion spring 310 (FIGS. 4A and 4B) could be replaced with a compliant polymer element. One end of the polymer element would be attached to the inboard disk 304 and the other would be attached to the outboard disk 312. The polymer material could be chosen for desirable elastic and viscous properties.

Vehicles benefiting from our invention can have more or less legs than the six-legged vehicle described above. If the rear segment 102, body-joint motor 104, body-joint chain 108, and rear drive chain 246 are simply removed from the vehicle in FIG. 1, a viable four-legged vehicle results as shown in FIG. 10. The middle axle 214 becomes the new rear axle. The vehicle is steered by turning the axis of rotation of the front whegs 200 and 202.

The vehicle design of FIG. 1 can be implemented in a large range of dimensional scales. A four-legged vehicle that is about 7.5 cm long been demonstrated as well as the 50 cm long vehicles described above. Larger and smaller vehicles that benefit from our invention are also practical and useful.

ADVANTAGES

We have embodied our invention in a vehicle that has several advantages over current legged vehicles. It is relatively lightweight and inexpensive, because only one drive-motor is necessary to propel the vehicle's six driving appendages or whegs. There is no need to accelerate or decelerate the drive-motor during each leg cycle. When the single drive-motor rotates at a constant speed, the vehicle moves at nearly a constant speed. It normally moves in an alternating tripod gait in which the front and rear whegs on one side of the body move together with the middle wheg on the other side of the body. This is the most common insect gait because it is the fastest gait that also provides the body with a stable support.

The compliant devices in the axles permit the vehicle to modify its gait, which provides two advantages. First, higher obstacles can be climbed. When contra-lateral whegs are in phase, their spokes can reach higher onto obstacles without the spokes on the opposing wheg interfering with the obstacle. Second, the vehicle is more stable on uneven terrain because more whegs are in the support phase. It is less likely to roll over as it climbs obstacles because the contra-lateral whegs provide supporting forces on the left and right side of the vehicle.

When the vehicle returns to even terrain, the whegs return to their original relative positions and the vehicle again walks in a tripod gait. No locomotion control software is needed to make these gait adjustments because they occur passively.

Whegs are advantageous for climbing because they reach on top of approaching obstacles that are higher than 1.5 times the length of one spoke. They also benefit movement on even terrain because they have multiple spokes that each function as legs to support and propel the body. Another advantage to using multi-spoke whegs is that the vehicle can continue moving despite the loss of a spoke. The ride is less smooth, but the vehicle can continue walking.

The body-flexion joint is advantageous for climbing because it can rotate the front segment of the vehicle up such that the front legs can reach onto taller obstacles. It can also rotate the front segment down to increase its mid-body ground clearance and permit the front legs to reach further downward.

The vehicle that embodies our invention has mobility over rectangular obstacles similar to legged vehicles and speed, in terms of body lengths per second, greater than current legged vehicles. It highly mobile, has a relatively low-cost, is lightweight, and uses a simple design. It does not need a control system for control of individual joints.

CONCLUSION AND SCOPE

A new vehicle, shown in FIG. 1 and described above, embodies the claims in this invention. It uses only one motor to propel its six driving appendages. Its driving appendages are specialized legs or wheel-legs that we call "whegs". Much of the vehicle's locomotion control is imbedded in passive mechanical systems. Passive compliant devices serially connect each wheg to the drive motor such that the whegs can move relative to each other even though the same motor drives them. The compliant devices are springably biased such that the vehicle nominally walks in an alternating tripod gait, or wheg phasing, where the front and rear whegs on one side of the body move in phase with the middle wheg on the opposite side of the body. The compliant devices permit the vehicle to change its wheg phasing passively when an obstacle perturbs a wheg. Thereby, the vehicle adapts to its terrain without an active control system. Mechanical stops in the compliant devices limit the wheg phase changes such that, at the extreme excursions, the gait is well tuned for climbing obstacles.

The vehicle's body consists of two segments connected by a joint, which permits relative rotation about the middle axle. This body flexion joint is activated by a separate actuator, which rotates the two body segments relative to one another. This body flexion enables the vehicle to lift its front segment to reach and climb taller obstacles and also to lower its front segment to increase its mid-body ground clearance and reach downward. The vehicle is steered by two small actuators, which turn the front and rear pairs of whegs in opposite directions. To turn left, the front whegs are turned left and the rear whegs are turned right.

Although the description above contains many specifics, these should not be construed as limiting the scope of the invention but as merely providing illustrations of some of the presently preferred embodiments of this invention. For example, the compliance can be built into the drive train in other ways with the same results. Each wheg could be driven by a separate compliant belt extending from the motor drive shaft. The compliance in the belt would replace the compliant device described above. Compliance can also be implemented using torsion bars or beam bending. Another alternative is for the vehicle to use conventional legs instead of whegs. Vehicles with different numbers of legs or whegs can also benefit from this invention. For example a vehicle with only three driving appendages or as many as one hundred or more could benefit from the passive leg phase or gait changes that are afforded by this invention. Another simple change is to implement compliance in the wheg spokes differently. For example the two piece spoke design with an internal spring can be replaced with a single element that, through its structural design and/or material properties, permits compliance in the radial direction.

We claim:

1. A vehicle, comprising:
   a. a body;
   b. one or more driving appendages;
   c. said driving appendages attached to said body to permit motion of said driving appendages to propel said body;
   d. an actuation device; and
   e. a drive train linking said actuation device to said driving appendages, said drive train comprising:
      one or more couplings, said couplings comprising:
      a) an input member, capable of cyclic motion;
      b) an output member, capable of cyclic motion;
      c) a torsionally compliant device unidirectionally biasing a relative phase of said input member and said output member;
      d) said output member coupled to one of said driving appendages; and
      e) said input member coupled to said actuation device.

2. The vehicle of claim 1, wherein said couplings include a limiting mechanism to limit said relative phasing to within a significant fraction of a cycle.

3. The vehicle of claim 1, further including a steering system.

4. The vehicle of claim 1, wherein said body comprises multiple body segments, and further includes a body flexion joint that connects said body segments and permits articulation of one body segment relative to another body segment, wherein said articulation is either:
   a. actively controlled,
   b. passively compliant, or
   c. actively controlled and passively compliant.

5. The vehicle of claim 1, wherein said driving appendages are compliant.

6. The vehicle of claim 5, comprising at least two driving appendages.

7. The vehicle of claim 5, comprising at least three driving appendages.

8. The vehicle of claim 5, comprising at least four driving appendages.

9. The vehicle of claim 5, comprising at least six driving appendages.

10. The vehicle of claim 1, further including a foot with a means of passive traction on each of said driving appendages.

11. The vehicle of claim 1, wherein said motion is rotational.

12. The vehicle of claim 1, wherein said torsionally compliant device includes a spring.

13. The vehicle of claim 12, wherein said spring has a preload.

14. The vehicle of claim 1, wherein said actuation device includes a motor.

15. A vehicle, comprising:
   a. a body;
   b. one or more driving appendages, said driving appendages comprising;
      1) a hub rotatably attached to said body and
      2) one or more spoke extensions from said hub to propel said body;
   c. an actuation device;
   d. a drive train linking said actuation device to said driving appendages, said drive train comprising:
      one or more rotary couplings, said rotary couplings comprising:
      a) an input member;
      b) an output member;
      c) said input member and said output member rotatably attached;
      d) a torsionally compliant device unidirectionally biasing a phase of said input member and said output member;
      e) said output member coupled to one of said driving appendages; and
      f) said input member coupled to said actuation device.

16. The vehicle of claim 15, wherein said rotary coupling includes a limiting mechanism to limit the relative phase of said input member and said output member to within a significant fraction of a cycle.

17. The vehicle of claim 16, wherein
   a. said limiting mechanism includes a rotary mechanical stop and
   b. said torsionally compliant device includes a torsional spring.

18. The vehicle of claim 15, further including a steering system.

19. The vehicle of claim 15, wherein said body comprises multiple body segments, and said body further includes a body flexion joint that connects said body segments and permits articulation, wherein said articulation is either:
   a. actively controlled,
   b. passively compliant, or
   c. actively controlled and passively compliant.

20. The vehicle of claim 15, wherein said driving appendages are compliant.

21. The vehicle of claim 20, wherein the spoke extensions are compliant.

22. The vehicle of claim 15, further including a foot with a means of passive traction on each of said spoke extensions of each said driving appendage.

23. The vehicle of claim 15, wherein said driving appendages have at least two spoke extensions.

24. The vehicle of claim 15, wherein said driving appendages have at least three spoke extensions.

25. The vehicle of claim 15, wherein said driving appendages have at least four spoke extensions.

26. A vehicle, comprising:
   a. a body;
   b. one or more legs;
   c. said legs attached to said body to permit motion;
   d. an actuation device; and
   e. a drive train linking said actuation device to said legs, said drive train comprising:
     one or more couplings, said couplings comprising:
       a) an input member, capable of cyclic motion;
       b) an output member, capable of cyclic motion;
       c) a torsionally compliant device unidirectionally biasing a relative phase of said input member and said output member;
       d) said output member coupled to one of said legs; and
       e) said input member coupled to said actuation device.

27. The vehicle of claim 26, wherein said couplings further include a limiting mechanism to limit said relative phasing of said input member and said output member to within a significant fraction of a cycle.

28. The vehicle of claim 26, further including a steering system.

29. The vehicle of claim 26, wherein said body comprises multiple body segments, and further includes a body flexion joint that connects said body segments and permits articulation, wherein said articulation is either:
   a. actively controlled,
   b. passively compliant, or
   c. actively controlled and passively compliant.

30. The vehicle of claim 26, wherein said legs are compliant.

31. The vehicle of claim 26, further including a foot with a means of passive traction on each of said legs.

32. A drive system, comprising:
   a drive member that provides a source of rotational power/torque;
   a pair of unidirectionally pretensioned torsionally compliant devices, each coupled to receive rotational power/torque via the drive member; and
   a pair of driving appendages, each coupled to a respective one of the torsionally compliant devices to rotate in response to the rotational power/torque provided by the respective torsionally compliant device;
   wherein the torsionally compliant devices allow a phase angle change between the pair of driving appendages in response to a force or torque applied to at least one of the driving appendages.

33. The drive system of claim 32, wherein a motor provides the rotational power/torque to the drive member.

34. The drive system of claim 32, wherein the drive member includes an axle.

35. The drive system of claim 32, wherein the drive member includes at least two drive members, each coupled to provide power/torque to a respective torsionally compliant device.

36. The drive system of claim 32, wherein the pair of torsionally compliant devices have a selected preload.

37. The drive system of claim 36, wherein the pair of driving appendages are out of phase with one another when the selected preload of both of the torsionally compliant devices has not been overcome.

38. The drive system of claim 36, wherein one of the driving appendages is rotated relative to the other driving appendage when the selected preload of one of the respective torsionally compliant devices has been overcome.

39. The drive system of claim 36, wherein the pair of torsionally compliant devices have a positive stop limiting the phase angle change.

40. The drive system of claim 39, wherein the maximum phase angle change is based on the design of the driving appendages.

41. A vehicle comprising:
   a frame;
   a motor secured to the frame; and
   a drive system in accordance with claim 32 secured to the frame and connected to the motor.

42. The vehicle of claim 41, comprising three drive systems.

43. The vehicle of claim 42, wherein the three drive systems are powered by a single motor.

44. The vehicle of claim 42, wherein the three drive systems are phased to employ an alternating tripod gait.

45. The vehicle of claim 44, wherein the individual driving appendages may be perturbed passively from a tripod gait on uneven terrain and return to a tripod gait on even terrain.

46. The vehicle of claim 44, wherein the frame comprises a front frame segment and a rear frame segment connected by a body flexion joint.

47. The vehicle of claim 46, wherein the body flexion joint may be actuated to allow the front frame segment to contact higher and/or lower terrain, wherein the actuation is active, passive, or a combination of active and passive actuation.

48. The vehicle of claim 41, comprising two drive systems wherein the two drive systems are phased to employ a diagonal gait when the selected preload of the torsionally compliant devices has not been overcome.

49. The vehicle of claim 48, wherein each of the driving appendages includes a respective hub and a number of extending members, and wherein the diagonal gait is such that when an extending member of one driving appendage contacts the terrain, an extending member of the driving appendage located on the opposite drive system and on the opposite side of the vehicle contacts the terrain in generally the same manner.

50. The vehicle of claim 48, wherein the individual driving appendages may be perturbed passively from a diagonal gait on uneven terrain and return to a diagonal gait on even terrain.

51. A drive train, comprising:
   a drive member;
   a driven member;
   a unidirectionally pretensioned compliant torsional member coupled between the drive and driven members to transmit power/torque from the drive member to the driven member and to allow a phase change between the drive member and the driven member in response to a force/torque applied to the driven member;

a second drive member;

a second driven member;

a second unidirectionally pretensioned compliant torsional member coupled between the second drive member and the second driven member to transmit power/torque from the second drive member to the second driven member and to allow a phase change between the second drive member and the second driven member in response to a force/torque applied to the second driven member; and a pair of driving appendages being secured to an object in a manner to permit their rotation, wherein one of the appendages is coupled to the driven member and the other appendage is coupled to the second driven member, wherein the pair of driving appendages cooperate to move the object over varying terrain and the compliant torsional members allow a relative phase change between the driving appendages in response to forces applied to the pair of driving appendages as they engage the terrain.

* * * * *